US012606137B2

(12) United States Patent     (10) Patent No.:   US 12,606,137 B2
Wei et al.     (45) Date of Patent:    Apr. 21, 2026

(54) BRAKE PEDALING SIMULATOR AND METHOD FOR EVALUATING BRAKING STATE OF VEHICLE

(71) Applicant: Automotive Research & Testing Center, Lugong (TW)

(72) Inventors: Jia-Le Wei, Lugong (TW); Tsung-Hua Hsu, Lugong (TW); Fu-Hsien Sun, Lugong (TW)

(73) Assignee: AUTOMOTIVE RESEARCH & TESTING CENTER, Lugong (TW)

( * ) Notice: Subject to any disclaimer, the term of this patent is extended or adjusted under 35 U.S.C. 154(b) by 375 days.

(21) Appl. No.: 18/539,511

(22) Filed: Dec. 14, 2023

(65) Prior Publication Data

US 2025/0196826 A1     Jun. 19, 2025

(51) Int. Cl.
    *B60T 8/40*       (2006.01)
    *B60T 7/04*       (2006.01)
    *B60T 17/22*      (2006.01)

(52) U.S. Cl.
    CPC .............. *B60T 8/409* (2013.01); *B60T 7/042* (2013.01); *B60T 17/22* (2013.01); *B60T 2220/04* (2013.01)

(58) Field of Classification Search
    CPC .......... B60T 8/409; B60T 7/042; B60T 17/22; B60T 2220/04; B60T 13/662
    See application file for complete search history.

(56) References Cited

U.S. PATENT DOCUMENTS

| | | | |
|---|---|---|---|
| 11,292,338 B2 | 4/2022 | Burke et al. | |
| 2019/0061717 A1* | 2/2019 | Takemura | ............. B60T 13/686 |
| 2020/0180579 A1* | 6/2020 | Heinz | ................... B60T 13/662 |
| 2020/0247379 A1* | 8/2020 | Yamamoto | .............. B60T 13/68 |
| 2022/0089135 A1 | 3/2022 | Austermeier et al. | |

FOREIGN PATENT DOCUMENTS

CN       109578488 B     6/2020

\* cited by examiner

*Primary Examiner* — Donald J Wallace

(74) *Attorney, Agent, or Firm* — Birch, Stewart, Kolasch & Birch, LLP

(57) ABSTRACT

A brake pedaling simulator includes a base seat, a housing, a deceleration indication unit, a sensing unit, a control unit, and first and second pressure units including their respective first and second pressing members and biasing members. The first pressing member is pushed by a brake pedal of a vehicle to compress the first biasing member and to push the second pressing member that compresses the second biasing member. The deceleration indication unit includes a movable slidable block. The sensing unit includes first and second sensors respectively sensing positions of the first pressing member and the slidable block and signally connected to the control unit. The control unit determines a braking state of the vehicle according to a difference between a displacement value of the first pressing member and a displacement value of the slidable block.

15 Claims, 10 Drawing Sheets

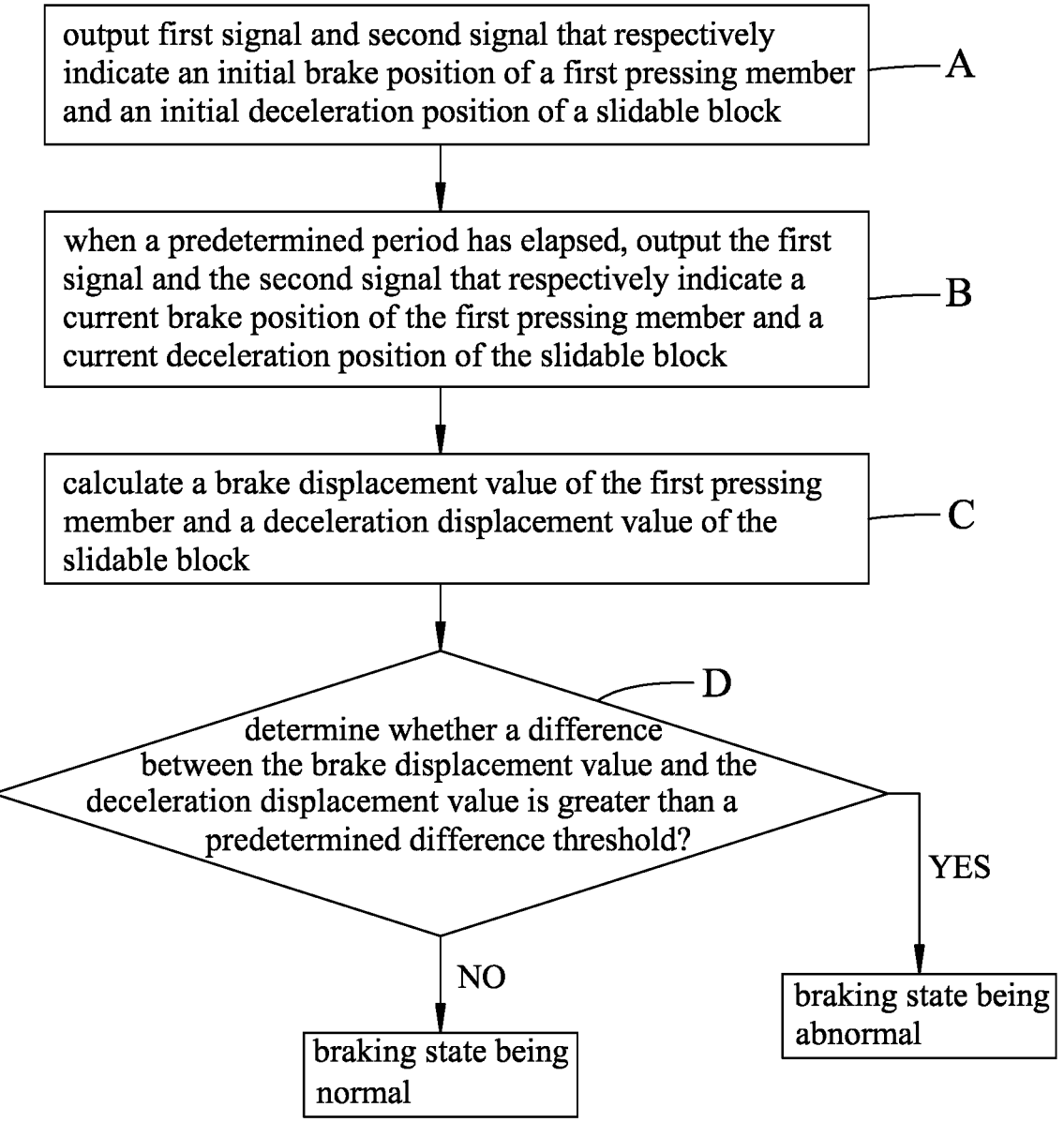

output first signal and second signal that respectively indicate an initial brake position of a first pressing member and an initial deceleration position of a slidable block — A when a predetermined period has elapsed, output the first signal and the second signal that respectively indicate a current brake position of the first pressing member and a current deceleration position of the slidable block — B calculate a brake displacement value of the first pressing member and a deceleration displacement value of the slidable block — C determine whether a difference between the brake displacement value and the deceleration displacement value is greater than a predetermined difference threshold? — D

YES

NO braking state being normal braking state being abnormal

FIG. 10

BRAKE PEDALING SIMULATOR AND METHOD FOR EVALUATING BRAKING STATE OF VEHICLE

FIELD

The disclosure relates to a pedaling simulator, and more particularly to a brake pedaling simulator.

BACKGROUND

In a vehicle that employs an internal combustion engine as a power source, a brake vacuum booster for assisting braking of the vehicle provides a brake feedback of stepping on a brake pedal of the vehicle, such that a user may be aware of a braking state of the vehicle. For a vehicle, e.g., a self-driving and an electric vehicle, which is not equipped with the brake vacuum booster, a drive-by-wire system is employed to facilitate steering of the vehicle. However, the drive-by-wire system cannot provide a sufficient and clear brake feedback when the user steps on the brake pedal. In particular, in the drive-by-wire system including a brake-by-wire device and an electro hydraulic brake, since there is no rigid connection between the brake pedal and the brake-by-wire device, a simulator is utilized to provide the brake feedback when the user steps on the brake pedal.

In recent years, a novel braking system such as Bosch iBooster has been developed, which generates an auxiliary force for braking and provides the brake feedback through an electronic control motor. Although such braking system that adopts an innovative electronic design is capable of providing the brake feedback more accurately, there is a risk of malfunctioning of electronic components of the braking system, which may lead to failure in braking function. In addition, such braking system has a relative complex structure, occupies a relatively large space, and has a relatively high cost.

SUMMARY

Therefore, an object of the disclosure is to provide a brake pedaling simulator and a method for evaluating a braking state of a vehicle that can alleviate at least one of the drawbacks of the prior art.

According to an aspect of the disclosure, a brake pedaling simulator adapted to be used in a vehicle that includes a brake pedal is provided. The brake pedaling simulator includes a base seat, a housing, a first pressure unit, a second pressure unit, a deceleration indication unit, a sensing unit, and a control unit. The housing is mounted on the base seat and cooperates with the base seat to define a primary chamber therebetween. The first pressure unit is disposed in the primary chamber and includes a first pressing member and a first biasing member. The first pressing member is adapted to be pushed by the brake pedal to move along an axis. The first biasing member is disposed between and abuts against the first pressing member and the base seat, and is compressed by the first pressing member when the first pressing member is pushed by the brake pedal. The second pressure unit is disposed in the primary chamber, and includes a second pressing member and a second biasing member. The second pressing member is disposed between the first pressing member and the base seat. The second biasing member is disposed between and abuts against the second pressing member and the base seat, and is compressed by the second pressing member when the second pressing member is pushed by the first pressing member to move along the axis. The deceleration indication unit is mounted on the housing and includes a slidable block that is movable parallel to the axis, and a deceleration resilient member that is disposed between and that abuts against the slidable block and the base seat, and that is compressed by the slidable block when the slidable block moves toward the base seat. The sensing unit is disposed on the housing, and includes a first sensor that is for sensing a position of the first pressing member and that is configured to output a first signal indicating the position of the first pressing member, and a second sensor that is for sensing a position of the slidable block and that is configured to output a second signal indicating the position of the slidable block. The control unit is signally connected to the sensing unit for receiving the first signal and the second signal respectively outputted by the first sensor and the second sensor, and is configured to calculate a displacement value of each of the first pressing member and the slidable block and a difference between the displacement value of the first pressing member and the displacement value of the slidable block to determine a braking state of the vehicle.

According to another aspect of the disclosure, a method for evaluating a braking state of a vehicle implemented by the abovementioned brake pedaling simulator. The method includes steps of:

- A) upon sensing of the position of each of the first pressing member and the slidable block, outputting the first signal and the second signal that respectively indicate an initial brake position of the first pressing member and an initial deceleration position of the slidable block to the control unit;
- B) outputting, when a predetermined period has elapsed, the first signal and the second signal that respectively indicate a current brake position of the first pressing member and a current deceleration position of the slidable block to the control unit;
- C) calculating, by the control unit, a brake displacement value of the first pressing member based on the initial brake position and the current brake position, and a deceleration displacement value of the slidable block based on the initial deceleration position and the current deceleration position; and
- D) determining, by the control unit, the braking state of the vehicle is abnormal when a difference between the brake displacement value and the deceleration displacement value is greater than a predetermined difference threshold.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

FIG. 10 is a flow chart illustrating a method for evaluating a braking state of the vehicle 1 implemented by the brake pedaling simulator according to the present disclosure.

DETAILED DESCRIPTION

Figure 1:
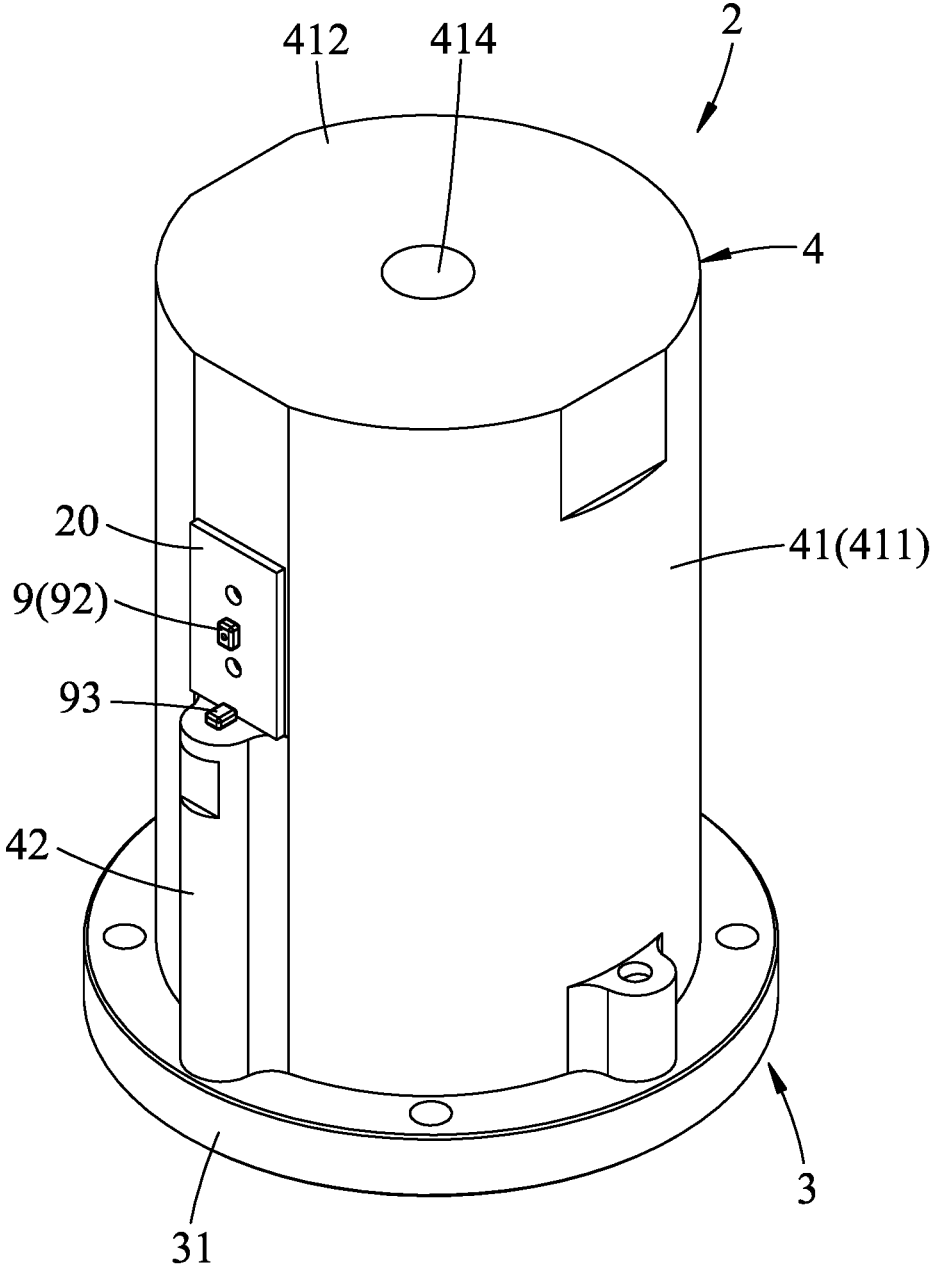
FIG. 1 is a perspective view of a brake pedaling simulator of a first embodiment according to the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently e.g., rotated 90 degrees or at other orientations and the spatially relative terms used herein may be interpreted accordingly.

Figure 2:
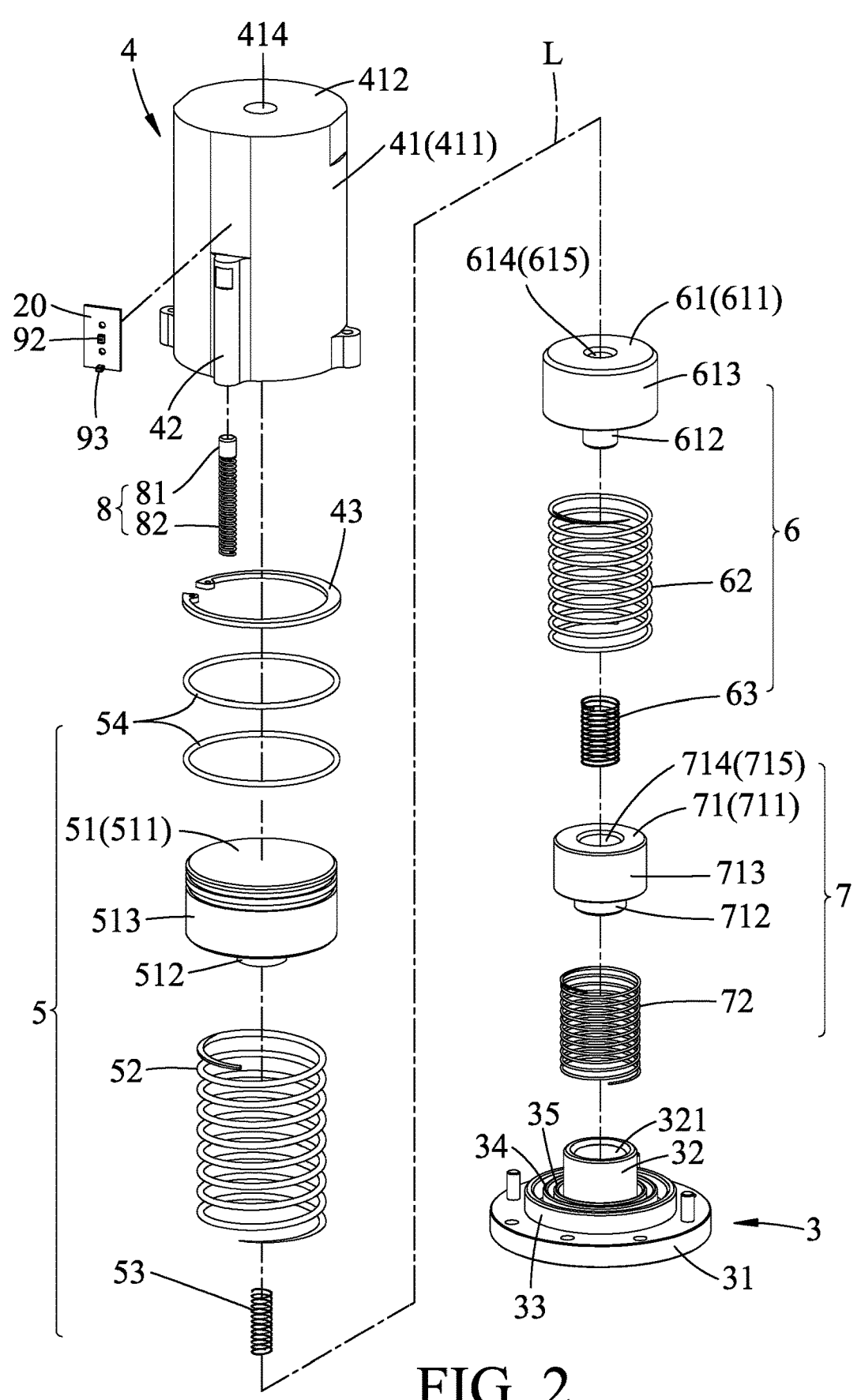
FIG. 2 is an exploded perspective view of the first embodiment.
Figure 3:
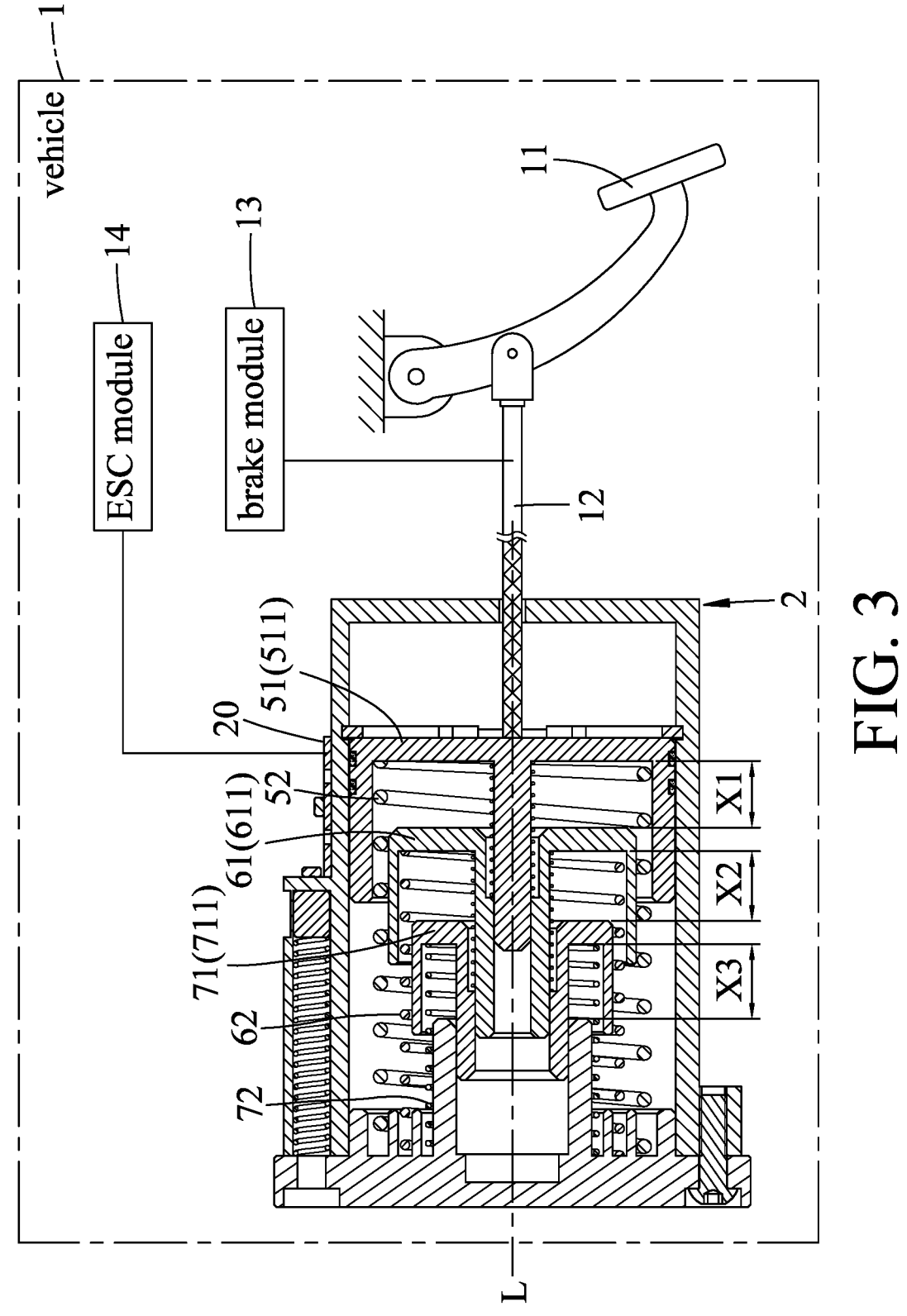
FIG. 3 is a schematic sectional view of the first embodiment adapted to be used in a vehicle.

Referring to FIGS. 1 to 3, a brake pedaling simulator 2 of a first embodiment according to the present disclosure is adapted to be used in a vehicle 1. The vehicle 1 includes a brake pedal 11, a connecting push rod 12 connected to and driven by the brake pedal 11, a brake module 13 signally connected to the connecting push rod 12, and an electronic stability control (ESC) module 14 signally connected to the brake pedaling simulator 2 of the present disclosure. Generally, the brake module 13 includes a brake pipe, a disc, a brake lining, and a caliper. Since the brake module 13 is not the main feature of the present disclosure, further details of the same are omitted in the drawings and the following description. The ESC module 14, which is also referred to as a dynamic stability control (DSC) system for a vehicle, is an active safety system for controlling the steering stability of the vehicle 1 and performs real-time monitoring and adjustment for the vehicle 1 during driving, thus ensuring that the vehicle 1 may remain steady under various driving conditions and lowering possibilities of accident.

Figure 4:
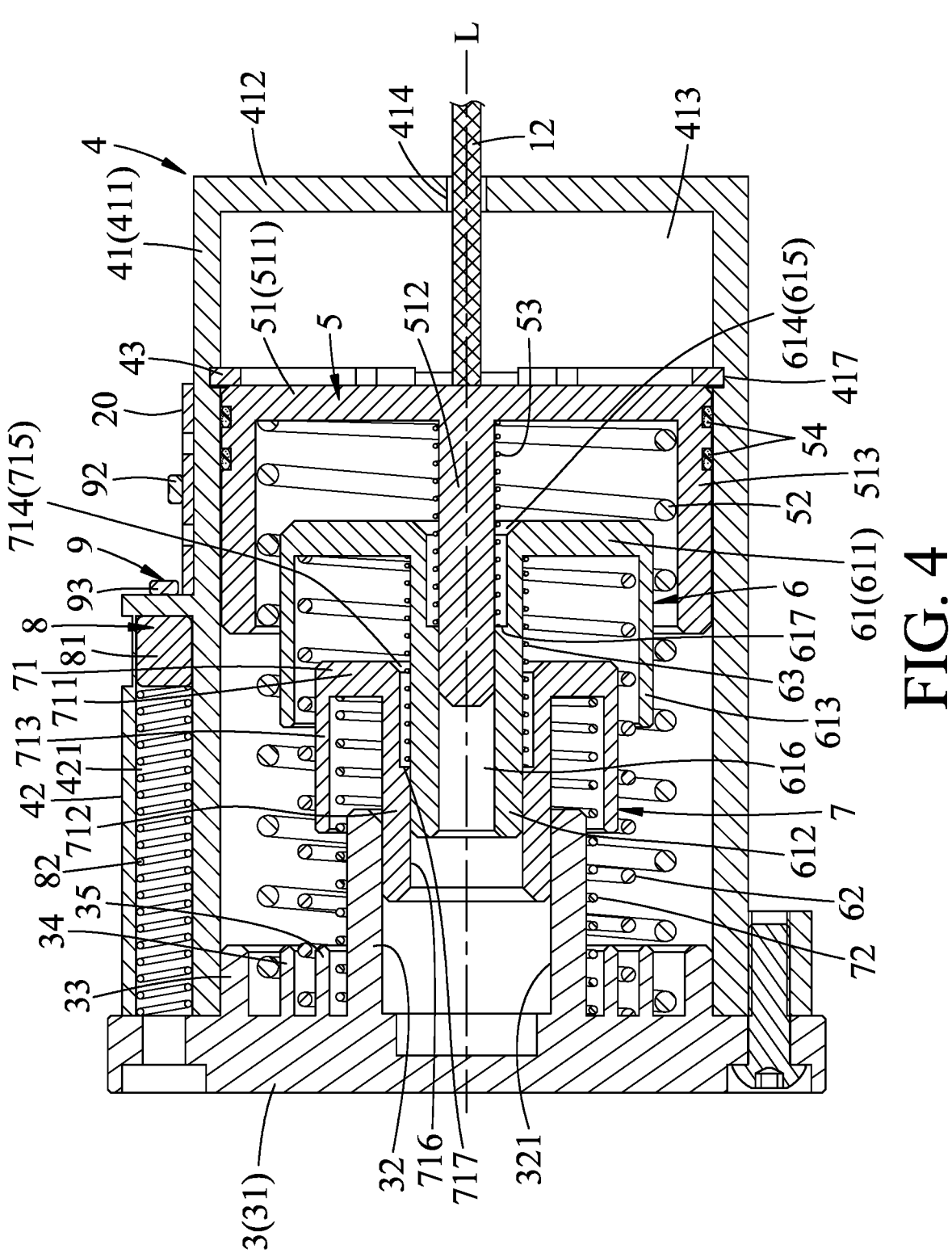
FIG. 4 is a sectional view of the first embodiment and a portion of the vehicle.

Referring to FIGS. 2 to 4, the brake pedaling simulator 2 includes a base seat 3, a housing 4, a first pressure unit 5, a second pressure unit 6, a third pressure unit 7, a deceleration indication unit 8, a sensing unit 9, and a control unit 20.

The base seat 3 includes a base plate 31, an annular wall 32, first limiting wall 33, a second limiting wall 34, and a third limiting wall 35. The annular wall 32 extends from the base plate 31 and defines a limiting hole 321 surrounding an axis (L) and being a blind hole that opens on a side opposite to the base plate 31. The third limiting wall 35, the second limiting wall 34, and the first limiting wall 33 are spaced apart one by one in a radial direction transverse to the axis (L), i.e., are arranged sequentially from and concentrically with respect to the annular wall 32.

The housing 4 is mounted on the base seat 3, and includes a primary housing portion 41, a secondary housing portion 42, and a retaining ring 43. The primary housing portion 41 has a peripheral wall 411 connected fixedly to the base plate 31, a top wall 412 connected to the peripheral wall 411, and a communication hole 414 formed in the top wall 412. The peripheral wall 411, the top wall 412, and the base plate 31 cooperatively define a primary chamber 413 thereamong. The secondary housing portion 42 is disposed on an outer surface of the peripheral wall 411 and cooperates with the base plate 31 to define a secondary chamber 421 separated from the primary chamber 413 and accommodating the deceleration indication unit 8 therein. The communication hole 414 is in spatial communication with the primary chamber 413 and is adapted for the connecting push rod 12 to extend therethrough into the primary chamber 413. The peripheral wall 411 is sleeved on the first limiting wall 33 of the base seat 3, has an inner surface formed with an engaging groove 417 that is in spatial communication with the primary chamber 413 and that engages with the retaining ring 43.

The first pressure unit 5 is disposed in the primary chamber 413, and includes a first pressing member 51, a first biasing member 52, a first buffering member 53, and two sealing members 54. The first pressing member 51 is adapted to be pushed by the brake pedal 11 to move along the axis (L). The first biasing member 52 abuts against the first pressing member 51 and the base plate 31 of the base seat 3. The first buffering member 53 abuts against the first pressing member 51 and the second pressure unit 6. The sealing members 54 are sleeved on the first pressing member 51

The first pressing member 51 has a first pressing plate 511 abutting against the first biasing member 52, a first middle column 512 extending from a center of the first pressing plate 511 along the axis (L) toward the base plate 31 of the base seat 3, and a first surrounding wall 513 extending from a periphery of the first pressing plate 511 toward the base plate 31 and surrounding the axis (L). The first surrounding wall 513 surrounds a portion of the first biasing member 52. In this embodiment, the first pressing member 51 is made of metal.

The first biasing member 52 has opposite ends abutting respectively against the first pressing plate 511 and the base plate 31, is disposed between the first limiting wall 33 and the second limiting wall 34, and is sleeved on the second limiting wall 34.

The first buffering member 53 is sleeved on the first middle column 512 of the first pressing member 51, and is disposed between and abuts against the first pressing plate 511 and the second pressure unit 6.

The sealing members 54 are sleeved on an outer surface of the first surrounding wall 513 and are disposed sealingly between the outer surface of the first surrounding wall 513 and the inner surface of the peripheral wall 411. A surface of the first pressing plate 511 that is opposite to the first biasing member 52 abuts against the retaining ring 43.

The first pressing plate 511 is adapted to be moved by the connecting push rod 12 along the axis (L) toward the base plate 31 to compress the first biasing member 52 and the first buffering member 53 when the first pressing member 51 is pushed by the brake pedal 11.

The second pressure unit 6 is disposed in the primary chamber 413, and includes a second pressing member 61, a second biasing member 62, and a second buffering member 63. The second pressing member 61 is disposed between the first pressing member 51 and the base plate 31 of the base seat 3. The second biasing member 62 is disposed between and abuts against the second pressing member 61 and the base plate 31. The second buffering member 63 is disposed between and abuts against the second pressing member 61 and the third pressure unit 7. The second pressing member 61 has a second pressing plate 611 abutting against the second biasing member 62, a second middle column 612 extending from a center of the second pressing plate 611 along the axis (L) toward the base plate 31, a second surrounding wall 613 extending from a periphery of the second pressing plate 611 toward the base plate 31 and surrounding the axis (L), and a primary hole 614 extending through the second pressing plate 611 and into the second middle column 612 along the axis (L).

The second surrounding wall 613 is surrounded by the first biasing member 52 and surrounds a portion of the second biasing member 62.

The primary hole 614 has a primary large hole portion 615 adjacent to the second pressing plate 611, a primary small hole portion 616 distal from the second pressing plate 611 and having a diameter smaller than a diameter of the primary large hole portion 615, and a primary shoulder portion 617 formed between the primary large hole portion 615 and the primary small hole portion 616.

The second biasing member 62 has opposite ends abutting respectively against the second pressing plate 611 and the base plate 31 of the base seat 3, is disposed between the second limiting wall 34 and the third limiting wall 35, and is sleeved on the third limiting wall 35.

The first middle column 512 of the first pressure unit 5 is movable along the axis (L), and extends through the primary large hole portion 615 into the primary small hole portion 616. Specifically, the first buffering member 53 is sleeved on the first middle column 512 and is disposed between and abuts against the first pressing plate 511 and the primary shoulder portion 617.

The second buffering member 63 is sleeved on the second middle column 612, and is disposed between and abuts against the second pressing plate 611 and the third pressure unit 7.

The second pressing plate 611 is pushed by the first pressing plate 511 to move along the axis (L) toward the base plate 31, and compresses the second biasing member 62 and the second buffering member 63. Specifically, the second biasing member 62 is compressed by the second pressing member 61 when the second pressing member 61 is pushed by the first pressing member 51 to move along the axis (L) toward the base seat 3.

The third pressure unit 7 is disposed in the primary chamber 413, and includes a third pressing member 71 disposed between the second pressing member 61 and the base seat 3, and a third biasing member 72 disposed between and abutting against the third pressing member 71 and the base seat 3.

The third pressing member 71 has a third pressing plate 711, a third middle column 712, a third surrounding wall 713, and a secondary hole 714. The third pressing plate 711 abuts against the third biasing member 72. The third middle column 712 extends from a center of the third pressing plate 711 along the axis (L) toward the base seat 3. The third surrounding wall 713 extends from a periphery of the third pressing plate 711 toward the base plate 31 and surrounds the axis (L). The secondary hole 714 extends through the third pressing plate 711 into the third middle column 712 along the axis (L).

The third surrounding wall 713 is surrounded by the second biasing member 62 and surrounds a portion of the third biasing member 72. The third surrounding wall 713 surrounds a portion of the annular wall 32. The third middle column 712 movably extends into the limiting hole 321 defined by the annular wall 32 along the axis (L).

The secondary hole 714 has a secondary large hole portion 715 adjacent to the third pressing plate 711, a secondary small hole portion 716 distal from the third pressing plate 711 and having a diameter smaller than a diameter of the secondary large hole portion 715, and a secondary shoulder portion 717 formed between the secondary large hole portion 715 and the secondary small hole portion 716. The second middle column 612 extends through the secondary large hole portion 715 into the secondary small hole portion 716. The second buffering member 63 is disposed between and abuts against the second pressing plate 611 of the second pressing member 61 and the secondary shoulder portion 717 of the third pressing member 71.

The third biasing member 72 has opposite ends abutting respectively against the third pressing plate 711 and the base plate 31, is disposed between the annular wall 32 and the third limiting wall 35, and is sleeved on the annular wall 32.

The third pressing plate 711 is pushed by the second pressing plate 611 to move along the axis (L) toward the base plate 31 and compresses the third biasing member 72 until the third pressing plate 711 abuts against one end of the annular wall 32 that is opposite to the base plate 31 along the axis (L). Specifically, the third biasing member 72 is compressed by the third pressing member 71 when the third pressing member 71 is pushed by the second pressing member 61 that is pushed by the first pressing member 51 to move along the axis (L) toward said base seat (3).

The deceleration indication unit 8 is mounted on the housing 4, particularly in the secondary chamber 421 defined by the secondary housing portion 42 and the base plate 31. The deceleration indication unit 8 includes a slidable block 81 and a deceleration resilient member 82. The slidable block 81 is movable parallel to the axis (L). The deceleration resilient member 82 is disposed between and abuts against the slidable block 81 and the base plate 31, and is compressed by the slidable block 81 when the slidable block 81 moves toward the base plate 31. In this embodiment, the slidable block 81 is made of metal, and moves toward the base plate 31 due to inertia during deceleration of the vehicle 1 so the deceleration resilient member 82 is compressed thereby.

The control unit 20 is implemented as a circuit board and is disposed on the peripheral wall 411. In this embodiment, the control unit 20 is a microcontroller or a controller such as, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

The sensing unit 9 includes a first sensor 92 disposed on the control unit 20 and adjacent to the first pressing member 51, and a second sensor 93 disposed on the secondary housing portion 42 and adjacent to the slidable block 81. The first sensor 92 is for sensing a position of the first pressing member 51, and is configured to output a first signal indicating the position of the first pressing member 51. The second sensor 93 is for sensing a position of the slidable block 81, and is configured to output a second signal indicating the position of the slidable block 81.

The control unit 20 is signally connected to the ESC module 14 and the sensing unit 9 for receiving the first signal and the second signal respectively outputted by the first sensor 92 and the second sensor 93, and is configured to calculate a displacement value of each of the first pressing member 51 and the slidable block 81, and a difference between the displacement value of the first pressing member 51 and the displacement value of the slidable block 81 to determine a braking state of the vehicle 1.

The control unit 20 outputs a brake abnormal signal to the ESC module 14 when determining that the braking state of the vehicle 1 is abnormal. The ESC module 14 is configured to check whether the braking state of the vehicle 1 is abnormal upon receipt of the brake abnormal signal. It should be noted that, in other embodiments, in a case where the ESC module 14 is omitted, the control unit 20 may output a warning signal, e.g., to light up a warning light (not shown) of the vehicle 1 when determining that the braking state of the vehicle 1 is abnormal.

Referring to FIGS. 3 and 4, when the brake pedal 11 is not stepped on by a user, the first pressing plate 511 is biased toward and abuts against the retaining ring 43 by the first biasing member 52 and the first buffering member 53.

The brake pedaling simulator 2 is operable to move among a first stage, a second stage, and a third stage.

Figure 5:
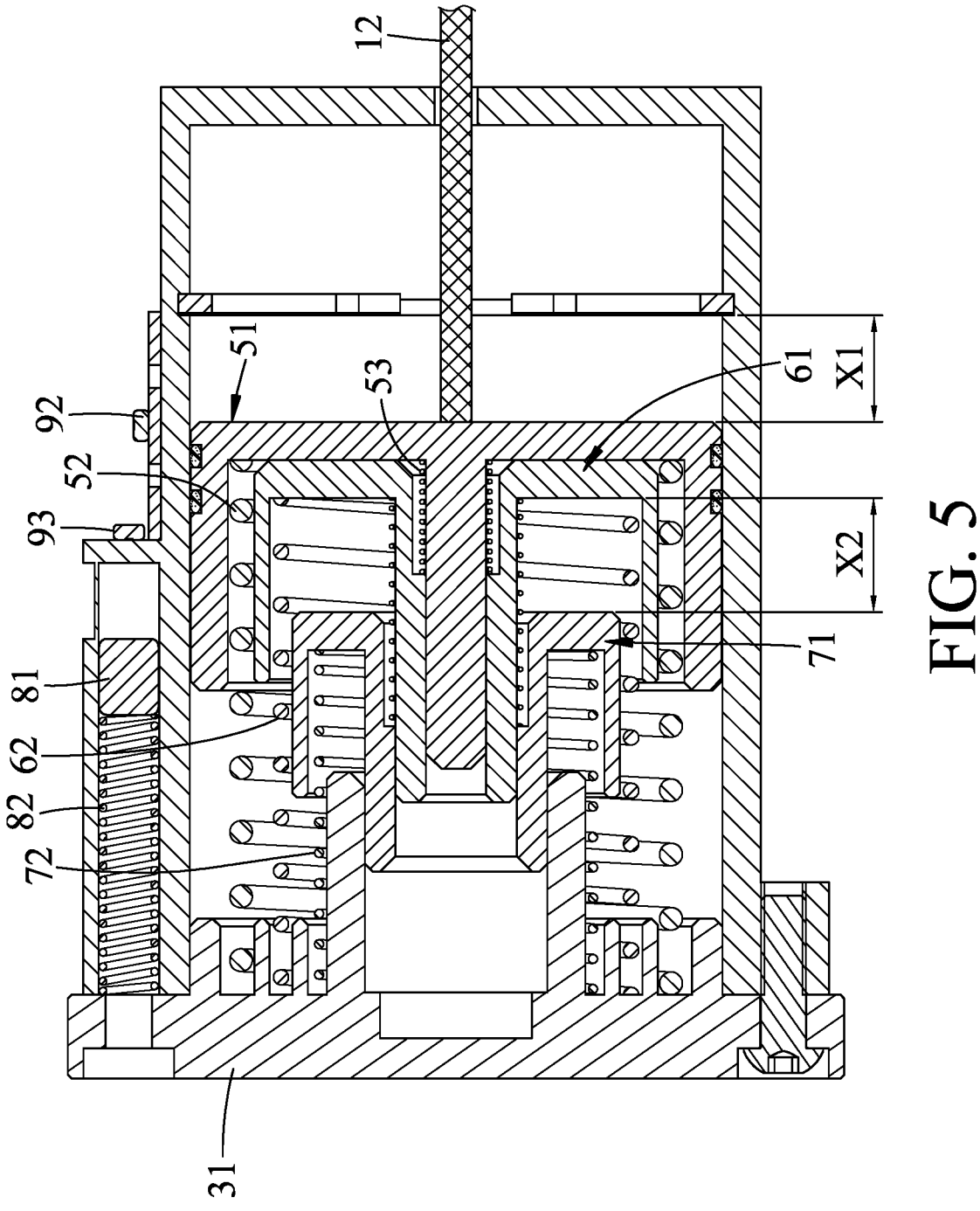
FIG. 5 is a sectional view similar to FIG. 4, but illustrating that a first pressing member of the first embodiment is pushed by a connecting push rod of the vehicle to move and compress a first biasing member.

As shown in FIGS. 3 and 5, when the brake pedal 11 is stepped on by the user, the brake pedaling simulator 2 is in the first stage, the connecting push rod 12 is driven by the brake pedal 11 to move along the axis (L) to push the first pressing member 51, and the brake module 13 is driven to slow down the vehicle 1. At this time, the first biasing member 52 and the first buffering member 53 are compressed by the first pressing member 51 that is pushed by the brake pedal 11 via the connecting push rod 12. Since the user exerts a stepping force on the brake pedal 11 to counteract a biasing force of each of the first biasing member 52 and the first buffering member 53, a reaction force is provided as a brake feedback for the user to be aware of operation of the brake module 13 of the vehicle 1. During deceleration of the vehicle 1, the slidable block 81 moves toward the base plate 31 and compresses the deceleration resilient member 82 due to inertia.

Figure 6:
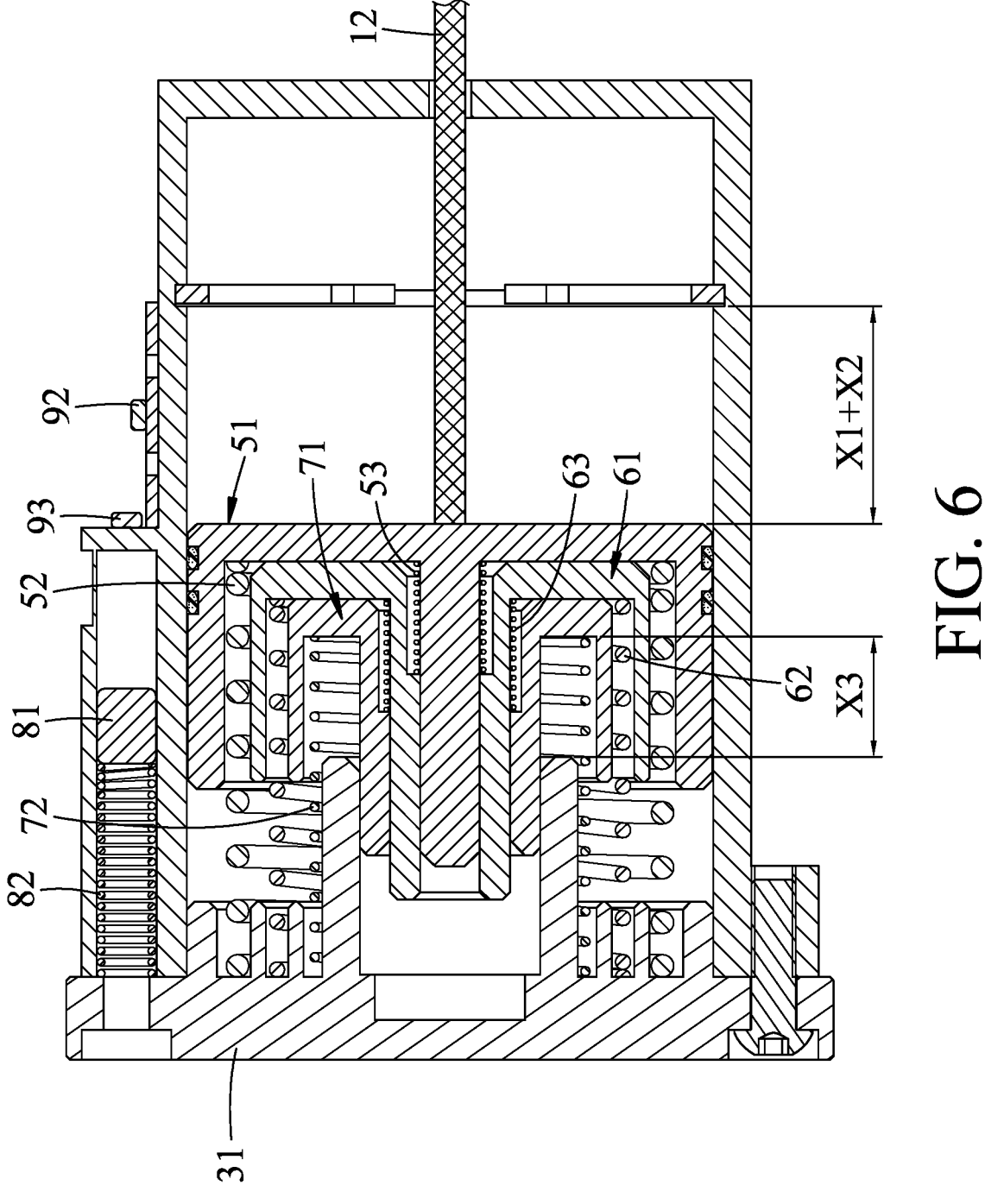
FIG. 6 is a sectional view similar to FIG. 5, but illustrating that a second pressing member of the first embodiment is pushed by the first pressing member to move and compress a second biasing member.

Referring to FIGS. 3 and 6, when the brake pedal 11 is stepped on by the user with another stepping force greater than the stepping force exerted in FIG. 5, the brake pedaling simulator 2 is in the second stage and the second pressing member 61 is pressed toward the base seat 3 by the first pressing member 51 that is pushed by the connecting push rod 12 driven by the brake pedal 11 so the second biasing member 62 and the second buffering member 63 are compressed. When the brake pedaling simulator 2 is in the second stage, it is required to exert the stepping force on the brake pedal 11 to counteract the biasing force of each of the first biasing member 52, the first buffering member 53, the second biasing member 62 and the second buffering member 62, and thus a greater brake feedback than that in FIG. 5 is provided. Similarly, since the stepping force exerted by the user in FIG. 6 is greater than that exerted in FIG. 5, the slidable block 81 further moves toward the base plate 31 and compresses the deceleration resilient member 82 due to inertia during deceleration of the vehicle 1.

Figure 7:
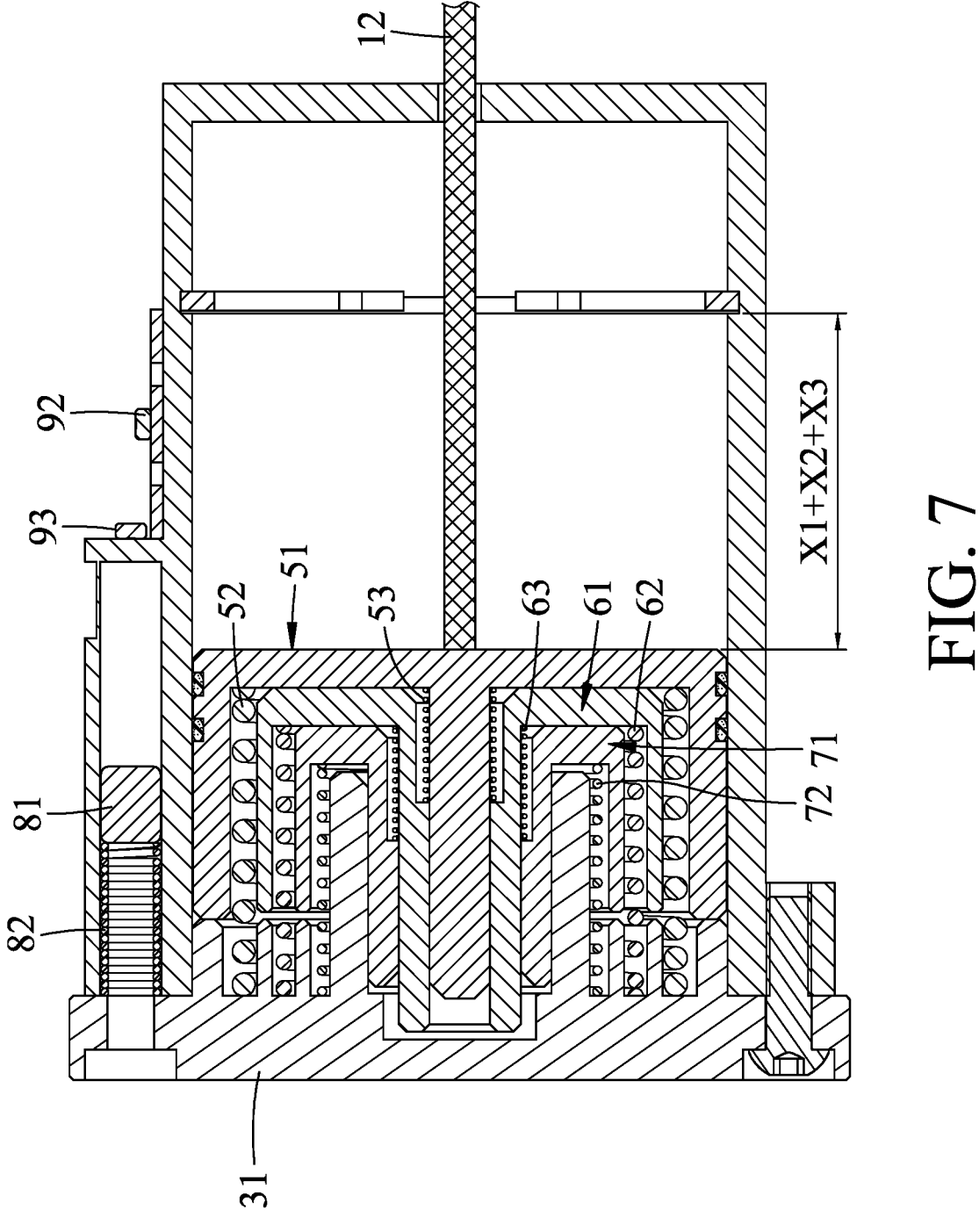
FIG. 7 is a sectional view similar to FIG. 6, but illustrating that a third pressing member of the first embodiment is pushed by the second pressing member to move and compress a third biasing member.

Referring to FIGS. 3 and 7, when the brake pedal 11 is stepped on by the user to a limit position where it is not possible for the brake pedal 11 to be further moved, the brake module 13 provides a maximum braking force to decelerate the vehicle 1, and the brake pedaling simulator 2 is in the third stage. The third pressing member 71 is pressed toward the base seat 3 to compress the third biasing member 72 by the second pressing member 61 that is pushed by the first pressing member 51 being pushed by the connecting push rod 12 which is driven by the brake pedal 11. At this position, the first biasing member 52 and the first buffering member 53 are compressed to their respective limit positions by the first pressing member 51; the second biasing member 62 and the second buffering member 63 are compressed to their respective limit positions by the second pressing member 61; and the third biasing member 72 is compressed to its limit position by the third pressing member 71. It is required to exert the stepping force on the brake pedal 11 to counteract the biasing force of each of the first biasing member 52, the first buffering member 53, the second biasing member 62, the second buffering member 63, and the third biasing member 72, and a brake feedback greater than that in FIG. 6 is provided. Since the stepping force exerted by the user is greater than that exerted in FIG. 6, the slidable block 81 further moves toward the base plate 31 and compresses the deceleration resilient member 82 to its limit position due to inertia during deceleration of the vehicle 1.

When the user stops to exert the stepping force on the brake pedal 11, the first biasing member 52, the second biasing member 62, and the third biasing member 72 provide restoring forces to respectively move the first pressing member 51, the second pressing member 61, and the third pressing member 71 to their original positions. Furthermore, restoring forces provided by the second buffering member 63 and the first buffering member 53 respectively facilitate the second pressing member 61 and the first pressing member 51 to move back to their respective original positions. When the first pressing member 51 is moved to its original position, the connecting push rod 12 is driven to restore the brake pedal 11.

Referring back to FIG. 3, when the brake pedaling simulator 2 is not operated, the first pressing member 51 is spaced apart from the second pressing member 61 along the axis (L) by a first stroke (X1), the second pressing member 61 is spaced apart from the third pressing member 71 along the axis (L) by a second stroke (X2), and the third pressing member 71 is spaced apart from the annular wall (32) along the axis (L) by a third stroke (X3). Since the first biasing member 52, the second biasing member 62, and the third biasing member 72 are connected in parallel, the stepping force exerted by the user on the brake pedal 11 and thus on the first pressing member 51 when the brake pedaling simulator 2 is at each of the first stage, the second stage, and the third stage may be calculated according to elastic modulus of each of the first biasing member 52, the second biasing member 62, and the third biasing member 72 and an extent of compression of each of the first biasing member 52, the second biasing member 62, and the third biasing member 72. Specifically, the first biasing member 52 has a first elastic modulus (K1), the second biasing member 62 has a second elastic modulus (K2), and the third biasing member 72 has a third elastic modulus (K3).

As shown in FIG. 5, when the brake pedaling simulator 2 is in the first stage, the first pressing member 51 is adapted to be pushed by the brake pedal 11 (see FIG. 3) to displace toward the base seat 3 by the first stroke (X1), and the first biasing member 52 is compressed by the first pressing member 51 by the first stroke (X1). According to Hooke's law, a force (F1) exerted by the brake pedal 11 via the push connecting rod 12 on the first pressing member 51 is equal to a product of the first elastic modulus (K1) of the first biasing member 52 and the first stroke (X1), i.e., F1=K1× X1.

As shown in FIG. 6, when the brake pedaling simulator 2 is in the second stage, the second pressing member 61 is pushed by the first pressing member 51 to displace toward the base seat 3 by the second stroke (X2), the second biasing member 62 is compressed by the second pressing member (61) by the second stroke (X2), and the first biasing member 52 is compressed by a sum of the first stroke (X1) and the second stroke (X2). According to Hooke's law, a force (F2) exerted by the brake pedal 11 via the connecting push rod 12 on the first pressing member 51 is equal to a sum of a product of the first elastic modulus (K1) and a sum of the first stroke (X1) and the second stroke (X2), and a product of the second elastic modulus (K2) of the second biasing member 62 and the second stroke (X2), i.e., F2=K1×(X1+X2)+K2×X2.

As shown in FIG. 7, when the brake pedaling simulator 2 is in the third stage, the third pressing member 71 is pushed by the second pressing member 61 to displace toward the base seat 3 by the third stroke (X3), the third biasing member 72 is compressed by the third stroke (X3), the second biasing member (62) is compressed by a sum of the second stroke (X2) and the third stroke (X3), and the first biasing member (52) is compressed by a sum of the first stroke (X1), the second stroke (X2), and the third stroke (X3). According to Hooke's law, a force (F3) exerted by the brake pedal 11 via the push connecting rod 12 on the first pressing member 51 is equal to a sum of a product of the first elastic modulus (K1) and a sum of the first stroke (X1), the second stroke (X2) and the third stroke (X3), a product of the second elastic modulus (K2) and a sum of the second stroke (X2) and the third stroke (X3), and a product of the third elastic modulus (K3) of the third biasing member 72 and the third stroke (X3), i.e., F3=K1×(X1+X2+X3)+K2×(X2+X3)+K3×X3.

Figure 8:
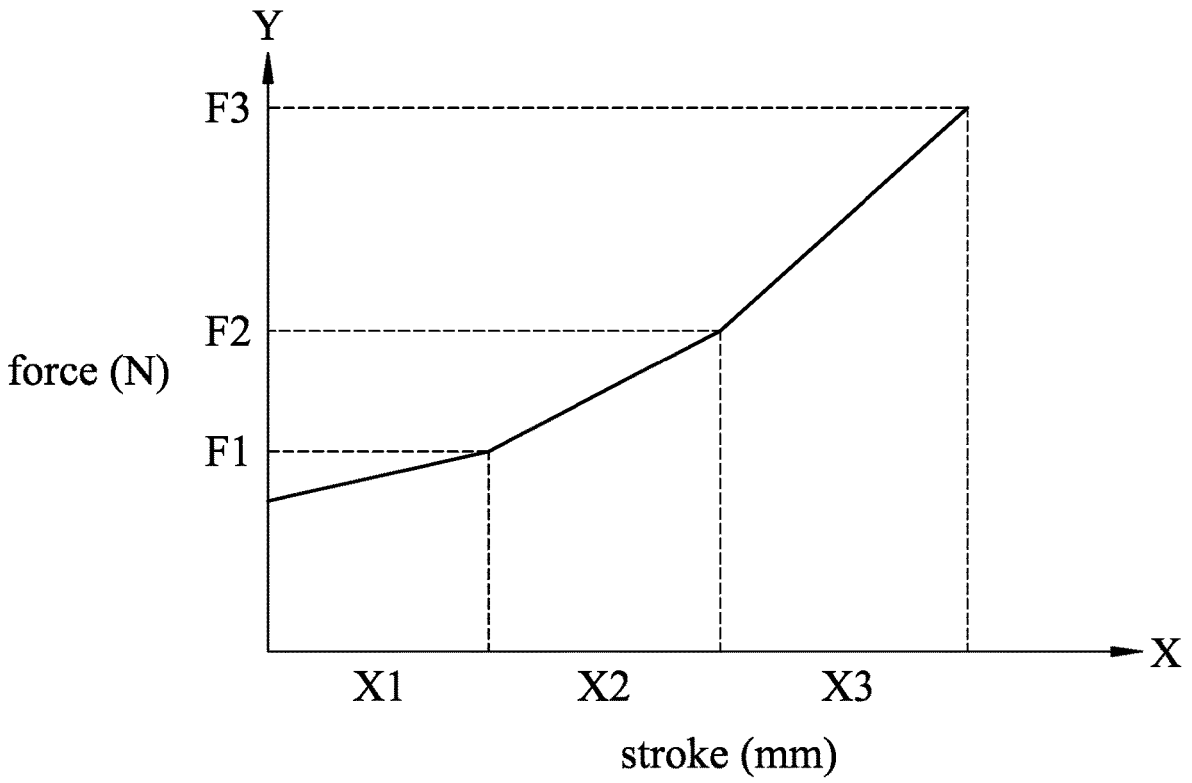
FIG. 8 is a plot diagram illustrating a relationship between first, second and third strokes of the first embodiment and a force exerted on the first pressing member.

Referring to FIG. 8, a plot diagram illustrating a relationship between the first stroke (X1), the second stroke (X2), and the third stroke (X3) and the forces (F1, F2, F3) exerted on the first pressing member 51 is shown. It should be noted that the forces (F1, F2, F3) to be exerted on the brake pedal 11 for moving the brake pedaling simulator 2 to each of the first stage, the second stage, and the third stage may be adjusted based on user requirements. Since the length of each of the first stroke (X1), the second stroke (X2), and the third stroke (X3) is constant, elastic modulus of each of the first biasing member 52, the second biasing member 62, and the third biasing member 72 may be calculated according to the equations shown in the Table below. In this way, the elastic modulus of each of the first biasing member 52, the second biasing member 62, and the third biasing member 72 may be quickly design based on user requirements for the force to be exerted on the brake pedal 11.

TABLE

| | elastic modulus (K1) of the first biasing member | elastic modulus (K2) of the second biasing member | elastic modulus (K3) of the third biasing member | Force |
|---|---|---|---|---|
| first stroke (X1) | compressed | — | — | F1 = K1 × X1 |
| second stroke (X2) | compressed | compressed | — | F2 = K1 × (X1 + X2) + K2 × X2 |

TABLE-continued

| | elastic modulus (K1) of the first biasing member | elastic modulus (K2) of the second biasing member | elastic modulus (K3) of the third biasing member | Force |
|---|---|---|---|---|
| third stroke (X3) | compressed | compressed | | F3 = K1 × (X1 + X2 + X3) + K2 × (X2 + X3) + K3 × X3 |

It should be noted that an elastic modulus of each of the first buffering member 53 and the second buffering member 63 is far smaller than the elastic modulus (K1, K2, K3) of each of the first biasing member 52, the second biasing member 62, and the third biasing member 72. Thus, biasing forces provided by the first buffering member 53 and the second buffering member 63 may be disregarded in calculation of the force (F1, F2, F3) exerted on the brake pedal 11. The first buffering member 53 is mainly provided as a resilient cushion for the first pressing member 51 when the first pressing member 51 moves toward the second pressing member 61 from the first stage to the second stage, and prevents the first pressing member 51 from colliding directly with the second pressing member 61, thereby reducing brake stutter generated during a period in which the user steps on the brake pedal 11. Similarly, the second buffering member 63 is mainly provided as a resilient cushion for the second pressing member 61 when the second pressing member 61 moves toward the third pressing member 71 from the second stage to the third stage, and prevents the second pressing member 61 from colliding directly with the third pressing member 71, thereby reducing brake shutter generated during the period in which the user steps on the brake pedal 11.

Figure 9:
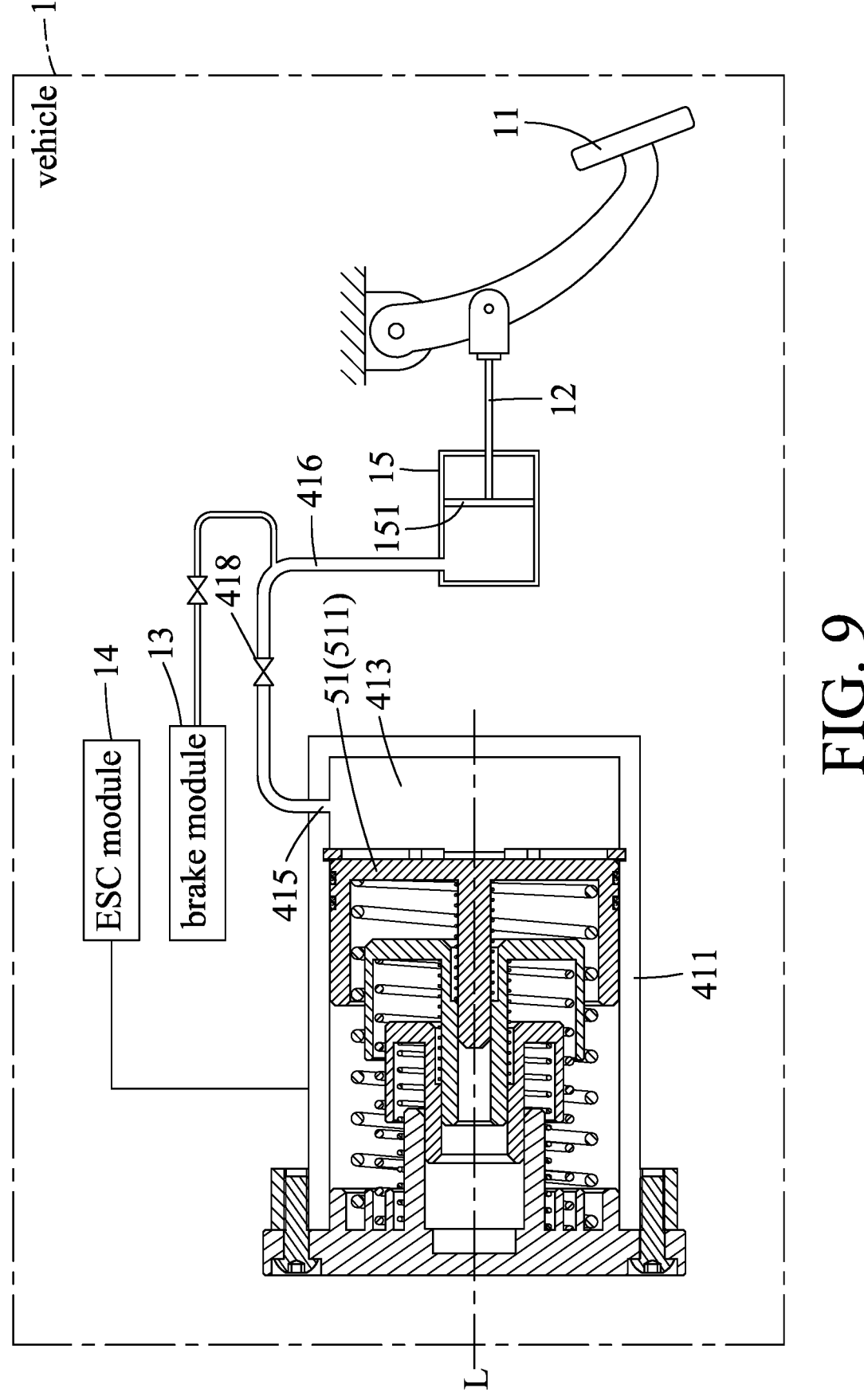
FIG. 9 is a schematic sectional view of a brake pedaling simulator of a second embodiment according to the present disclosure and a vehicle.

Referring to FIG. 9, a brake pedaling simulator 2 of a second embodiment according to the present disclosure is similar to the first embodiment and the differences between the first embodiment and the second embodiment reside in the following.

The vehicle 1 further includes an oil cylinder 15 that is filled with brake oil and that includes a piston 151 connected to the connecting push rod 12 and driven thereby when the brake pedal 11 is stepped on. In this embodiment, the top wall 412 of the primary housing portion 41 is not formed with the communication hole 414 (see FIG. 4), and the primary housing portion 41 has an oil hole 415, a conveying tube 416, and a solenoid valve 418. The oil hole 415 is formed in the peripheral wall 411 and is in spatial communication with the primary chamber 413. The conveying tube 416 is adapted for conveying the brake oil between the oil cylinder 15 and the primary chamber 413 through the oil hole 415. The solenoid valve 418 is disposed on the conveying tube 416. Specifically, the oil hole 415 is adapted for the brake oil to flow therethrough into the primary chamber 413, and the conveying tube 416 has opposite ends in spatial communication respectively with the oil cylinder 15 and the oil hole 415. The solenoid valve 418 is a normally closed solenoid valve adapted for controlling flow of the brake oil in the conveying tube 416 and avoids undesired back flow of the brake fluid. When the brake pedal 11 is stepped on by the user, the connecting push rod 12 is driven to push the piston 151 so the brake oil in the oil cylinder 15 flows into the primary chamber 413 to move the first pressing member 51 along the axis (L) and to compress the first biasing member 52. Since the structure and operations of the first pressure unit 5, the second pressure unit 6, and the third pressure unit 7 of the second embodiment are the same as those disclosed in the first embodiment, further detail of the same are omitted herein. It should be noted that, in the second embodiment, when the user stops to step on the brake pedal 11, the first pressing member 51 is biased by the first biasing member 52 and the first buffering member 53 to return to its original position, so the brake oil flows out of the primary chamber into the oil cylinder 15 to push the piston 151, thereby restoring the connecting push rod 12 and the brake pedal 11 to their respective original positions.

Referring to FIG. 10, a method for evaluating the braking state of the vehicle 1 is implemented by the brake pedaling simulator 2 of the present disclosure and includes following steps.

In step A), upon sensing of an initial brake position of the first pressing member 51 and an initial deceleration position of the slidable block 81, the first sensor 92 and the second sensor 93 respectively output an initial first signal and an initial second signal that respectively indicate the initial brake position and the initial deceleration position to the control unit 20. In one embodiment, the control unit 20 may initialize the first sensor 92 and the second sensor 93 by resetting the same.

In step B), the first sensor 92 and the second sensor 93 respectively output, for a predetermined period, the first signal and the second signal that respectively indicate a current brake position of the first pressing member 51 and a current deceleration position of the slidable block 81 to the control unit 20.

In step C), the control unit 20 calculates a brake displacement value of the first pressing member 51 based on the initial brake position and the current brake position, and a deceleration displacement value of the slidable block 81 based on the initial deceleration position and the current deceleration position.

The brake displacement value calculated in step C) is equal to a quotient of a distance between the initial brake position and the current brake position divided by a predetermined total brake stroke length of the first pressing member 51. In this embodiment, the control unit 20 further determines whether a brake operation is performed by the vehicle 1. Specifically, the control unit 20 determines that the brake operation is performed by the vehicle 1 when the brake displacement value is greater than a predetermined brake threshold, and that the brake operation is not performed by the vehicle 1 when the brake displacement value is not greater than the predetermined brake threshold. For example, in a case where the initial brake position is at a position marked as 0 mm, the current brake position is at a position marked as 5 mm, the predetermined total brake stroke length of the first pressing member 51 is given as 20 mm, and the predetermined brake threshold is given as 5%, a distance between the initial brake position and the current brake position is calculated to be 5 mm, and the brake displacement value is calculated to be $5/20=25\%$. Since the brake displacement value of 25% is greater than the predetermined brake threshold of 5%, the control unit 20 determines that the brake operation is performed by the vehicle 1.

It should be noted that, in one embodiment, the initial brake position of the first pressing member 51 outputted by the first sensor 92 in step A) is sensed at a first time point, and the current brake position outputted in step B) is sensed at a second time point after the predetermined period has elapsed since the first time point. In such embodiment, the brake displacement value may be a quotient of a distance between the initial brake position of the first pressing member 51 at the first time point and the current brake position of the first pressing member 51 at the second time point divided by the predetermined total brake stroke length of the first pressing member 51. In a case where the initial brake position is at a position marked as 5 mm, the current brake position is at a position marked as 6 mm, the predetermined total brake stroke length of the first pressing member 51 is given as 20 mm, and the predetermined brake threshold is given as 5%, a distance between initial brake position and the current brake position is calculated to be 1 mm and the brake displacement value is equal to $1/20=5\%$. Since the brake displacement value is equal to and is not greater than the predetermined brake threshold of 5%, the control unit 20 determines that the brake operation is not performed by the vehicle 1.

It should be noted that the manner for calculating the brake displacement value may vary according to user requirements, and the predetermined total brake stroke length may be adjusted based on design requirements of an overall structure of the brake pedaling simulator 2. In addition, the predetermined brake threshold is also adjustable with reference to different scenarios, such as road conditions, rugged terrains, climate, etc., and is not limited to the specific value exemplified above.

The deceleration displacement value is calculated by the control unit 20 in a manner similar to calculation of the brake displacement value. Specifically, the deceleration displacement value is equal to a quotient of a distance between the initial deceleration position and the current deceleration position divided by a predetermined total deceleration stroke length of the slidable block 81. In one embodiment, the initial deceleration position of the slidable block 81 outputted by the second sensor 93 in step A) is sensed at the first time point, and the current deceleration position of the slidable block 81 outputted in step B) is sensed at the second time point. In this embodiment, the control unit 20 further determines whether a deceleration operation is performed by the vehicle 1. Specifically, the control unit 20 determines that the deceleration operation is performed by the vehicle 1 when the deceleration displacement value is greater than a predetermined deceleration threshold, and that the deceleration operation is not performed by the vehicle 1 when the deceleration displacement value is not greater than the predetermined deceleration threshold. For example, in a case where the initial deceleration position is at a position marked as 0 mm, the current deceleration position is at a position marked as 2 mm, the predetermined total deceleration stroke length of the slidable block 81 is given as 20 mm, and the predetermined deceleration threshold is given as 5%, a distance between the initial deceleration position and the current deceleration position is calculated to be 2 mm, and the deceleration displacement value is calculated to be $2/20=10\%$. Since the deceleration displacement value of 10% is greater than the predetermined deceleration threshold of 5%, the control unit 20 determines that the deceleration operation is performed by the vehicle 1.

It should be noted that the manner for calculating the deceleration displacement value may vary according to the user requirements and the predetermined total deceleration stroke length may be adjusted based on design requirements of the overall structure of the brake pedaling simulator 2. In addition, the predetermined deceleration threshold is also adjustable according to different scenarios, such as road conditions, rugged terrains, climate, etc., and is not limited to the specific value exemplified above.

In Step D), the control unit 20 determines a braking state of the vehicle 1 is abnormal when a difference between the brake displacement value and the deceleration displacement value is greater than a predetermined difference threshold. The control unit 20 determines that the braking state of the vehicle 1 is normal when the difference is smaller than or equal to the predetermined difference threshold. The control unit 20 determines that the braking state is abnormal when the difference is greater than the predetermined difference threshold and outputs the warning signal to warn the user the braking state being abnormal. For example, when the vehicle 1 includes the ESC module 14 or an anti-lock braking (ABS) system (not shown), the brake abnormal signal may be outputted by the control unit 20 to the ESC module 14 or the ABS module that is configured to check whether the braking state of the vehicle 1 is abnormal.

For example, in a case where the brake displacement value obtained from calculation in step C) is 25%, the deceleration displacement value obtained from calculation in step C) is 10%, and the predetermined difference threshold is given as 5%, the difference is calculated to be 15%, which is greater than the predetermined difference threshold of 5%, the control unit 20 determines that the braking state of the vehicle 1 is abnormal and outputs the brake warning signal to the driver and the ESC module 14 or the ABS module to facilitate steering of the vehicle 1.

It should be noted that the predetermined difference threshold is adjustable with reference to different scenarios, such as road conditions, rugged terrains, climate, etc., and is not limited to the specific value exemplified above.

According to the above description, the advantages and effects of the brake pedaling simulator 2 of the present disclosure are summarized as follows.

First, a mechanical structure of the brake pedaling simulator 2 provides a brake feedback for the user when stepping on the brake pedal 11. Since the mechanical structure of the brake pedaling simulator 2 is relatively simple, a relative low cost and compact structure of the brake pedaling simulator 2 may be achieved. Furthermore, a risk of failure in braking function may be lowered since no electronic components are employed.

Second, since the lengths of the first stroke (X1), the second stroke (X2), and the third stroke (X3) are constant, the force to be exerted on the brake pedal 11 and the elastic modulus of each of the first biasing member 52, the second biasing member 62, and the third biasing member 72 may be simply altered based on user requirements.

Third, by virtue of the first sensor 92 and the second sensor 93 that respectively sense the positions of the first pressing member 51 and the slidable block 81, the control unit 20 may determine the braking state of the vehicle 1 accordingly.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects;

such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A brake pedaling simulator adapted to be used in a vehicle that includes a brake pedal, said brake pedaling simulator comprising:

a base seat;

a housing mounted on said base seat and cooperating with said base seat to define a primary chamber therebetween;

a first pressure unit disposed in said primary chamber and including a first pressing member that is adapted to be pushed by the brake pedal to move along an axis, and a first biasing member that is disposed between and abuts against said first pressing member and said base seat, and that is compressed by said first pressing member when said first pressing member is pushed by the brake pedal a second pressure unit disposed in said primary chamber, and including a second pressing member that is disposed between said first pressing member and said base seat, and a second biasing member that is disposed between and that abuts against said second pressing member and said base seat and that is compressed by said second pressing member when said second pressing member is pushed by said first pressing member to move along the axis;

a deceleration indication unit mounted on said housing and including a slidable block that is movable parallel to the axis, and a deceleration resilient member that is disposed between and that abuts against said slidable block and said base seat, and that is compressed by said slidable block when said slidable block moves toward said base seat;

a sensing unit disposed on said housing, and including a first sensor that is for sensing a position of said first pressing member and that is configured to output a first signal indicating the position of said first pressing member, and a second sensor that is for sensing a position of said slidable block and that is configured to output a second signal indicating the position of said slidable block; and a control unit signally connected to said sensing unit for receiving the first signal and the second signal respectively outputted by said first sensor and said second sensor, and configured to calculate a displacement value of each of said first pressing member and said slidable block according to the first signal and the second signal and a difference between the displacement value of said first pressing member and the displacement value of said slidable block to determine a braking state of the vehicle.

2. The brake pedaling simulator as claimed in claim 1, wherein said housing includes:

a primary housing portion cooperating with said base seat to define said primary chamber, and a secondary housing portion disposed on an peripheral wall of said primary housing portion, and cooperating with said base seat and said peripheral wall to define a secondary chamber that accommodates said deceleration indication unit therein.

3. The brake pedaling simulator as claimed in claim 1, wherein said first pressure unit further includes a first buffering member disposed between and abutting against said first pressing member and said second pressing member.

4. The brake pedaling simulator as claimed in claim 1, wherein:

said first pressing member has a first pressing plate abutting against said first biasing member, and a first middle column extending from said first pressing plate along the axis toward said base seat;

said second pressing member has a second pressing plate abutting against said second biasing member, a second middle column extending from said second pressing plate along the axis toward said base seat, and a primary hole extending through said second pressing plate and into said second middle column along the axis, and having a primary large hole portion that is adjacent to said second pressing plate, a primary small hole portion that is distal from said second pressing plate and that has a diameter smaller than a diameter of said primary large hole portion, and a primary shoulder portion that is formed between said primary large hole portion and said primary small hole portion, said first middle column extending through said primary large hole portion into said primary small hole portion, said first buffering member being sleeved on said first middle column and disposed between and abutting against said first pressing plate and said primary shoulder portion.

5. The brake pedaling simulator as claimed in claim 4, further comprising:

a third pressure unit disposed in said primary chamber, and including a third pressing member that is disposed between said second pressing member and said base seat, and a third biasing member that is disposed between and abuts against said third pressing member and said base seat, and that is compressed by said third pressing member when said third pressing member is pushed by said second pressing member to move along the axis toward said base seat.

6. The brake pedaling simulator as claimed in claim 5, wherein:

said second pressure unit further includes a second buffering member disposed between and abutting against said second pressing member and said third pressing member;

said third pressing member has a third pressing plate abutting against said third biasing member, a third middle column extending from said third pressing plate along the axis toward said base seat, and a secondary hole extending through said third pressing plate into said third middle column along the axis, having a secondary large hole portion that is adjacent to said third pressing plate, a secondary small hole portion that is distal from said third pressing plate and that has a diameter smaller than a diameter of said secondary large hole portion, and a secondary shoulder portion that is formed between said secondary large hole portion and said secondary small hole portion, said second middle column extending through said secondary large hole portion and into said secondary small hole portion, said second buffering member being sleeved on said second middle column and disposed between and abutting against said second pressing plate and said secondary shoulder portion.

7. The brake pedaling simulator as claimed in claim 6, wherein said base seat includes a base plate, and an annular wall extending from said base plate and defining a limiting hole that surrounds the axis and that allows said third middle column to movably extend therein.

8. The brake pedaling simulator as claimed in claim 7, wherein:

said brake pedaling simulator is operable to move among a first stage, a second stage, and a third stage, when said brake pedaling simulator is not operated, said first pressing member is spaced apart from said second pressing member along the axis by a first stroke, said second pressing member is spaced apart from said third pressing member along the axis by a second stroke, and said third pressing member is spaced apart from said annular wall along the axis by a third stroke;

when said brake pedaling simulator is in the first stage, said first pressing member is adapted to be pushed by the brake pedal to displace toward said base seat by the first stroke, and said first biasing member is compressed by said first pressing member by the first stroke;

when said brake pedaling simulator is in the second stage, said second pressing member is pushed by said first pressing member to displace toward said base seat by the second stroke, said second biasing member is compressed by said second pressing member by the second stroke, and said first biasing member is compressed by a sum of the first stroke and the second stroke;

when said brake pedaling simulator is in the third stage, said third pressing member is pushed by said second pressing member to displace toward said base seat by the third stroke, said third biasing member is compressed by the third stroke, said second biasing member is compressed by a sum of the second stroke and the third stroke, and said first biasing member is compressed by a sum of the first stroke, the second stroke and the third stroke;

said first biasing member has a first elastic modulus, said second biasing member has a second elastic modulus, and said third biasing member has a third elastic modulus;

said control unit is configured to calculate a force exerted by the brake pedal on said first pressing member when said brake pedaling simulator is at each of the first stage, the second stage, and the third stage according to the first elastic modulus, the second elastic modulus, and the third elastic modulus and an extent of compression of each of said first biasing member, said second biasing member and the third biasing member.

9. The brake pedaling simulator 2 as claimed in claim 1, the vehicle further including a connecting push rod driven by the brake pedal to move along the axis, wherein said housing includes a primary housing portion cooperating with said base seat to define said primary chamber, and has a peripheral wall connected to said base seat, a top wall connected to said peripheral wall, and a communication hole formed in said top wall, in spatial communication with said primary chamber, and adapted for the connecting push rod to extend therethrough into said primary chamber so said first pressing member is adapted to be moved by the connecting push rod.

10. The brake pedaling simulator as claimed in claim 1, the vehicle further including an oil cylinder that is filled with brake oil and that includes a piston driven by the brake pedal to move, wherein said housing includes a primary housing portion cooperating with said base seat to define said primary chamber and having an oil hole in spatial communication with said primary chamber and adapted for the brake oil to flow therethrough into said primary chamber when the brake pedal is stepped on to move the piston so said first pressing member is adapted to be moved by the brake oil along the axis.

11. A method for evaluating a braking state of a vehicle implemented by the brake pedaling simulator as claimed in claim 1, the method comprising steps of:

A) upon sensing of an initial brake position of the first pressing member and an initial deceleration position of the slidable block, outputting an initial first signal and an initial second signal that respectively indicate the initial brake position and the initial deceleration position to the control unit;

B) outputting, for a predetermined period, the first signal and the second signal that respectively indicate a current brake position of the first pressing member and a current deceleration position of the slidable block to the control unit;

C) calculating, by the control unit, a brake displacement value of the first pressing member based on the initial brake position and the current brake position, and a deceleration displacement value of the slidable block based on the initial deceleration position and the current deceleration position; and D) determining, by the control unit, the braking state of the vehicle is abnormal when a difference between the brake displacement value and the deceleration displacement value is greater than a predetermined difference threshold.

12. The method as claimed in claim 11, wherein:

in step C), the brake displacement value is equal to a quotient of a distance between the initial brake position and the current brake position divided by a predetermined total brake stroke length of the first pressing member, the method further comprising a step of determining, by the control unit, whether a brake operation is performed by the vehicle, which includes determining the brake operation is performed by the vehicle when the brake displacement value is greater than a predetermined brake threshold, and determining the brake operation is not performed by the vehicle when the brake displacement value is not greater than the predetermined brake threshold.

13. The method as claimed in claim 11, wherein:

in step A), sensing the initial brake position at a first time point; and in step B), sensing the current brake position at a second time point after the predetermined period has elapsed since the first time point;

in step C), the brake displacement value is equal to a quotient of a distance between the initial brake position and the current brake position divided by a predetermined total brake stroke length of the first pressing member, the method further comprising a step of determining, by the control unit, whether a brake operation is performed by the vehicle, which includes determining the brake operation is performed by the vehicle when the brake displacement value is greater than a predetermined brake threshold, and determining the brake operation is not performed by the vehicle when the brake displacement value is not greater than a predetermined brake threshold.

14. The method as claimed in claim 11, wherein:

in step C), the deceleration displacement value is equal to a quotient of a distance between the initial deceleration position and the current deceleration position divided by a predetermined total deceleration stroke length of the slidable block, the method further comprising a step of determining, by the control unit, whether a deceleration operation is performed by the vehicle, which includes determining the deceleration operation is performed by the vehicle when the deceleration displacement value is greater than a predetermined deceleration threshold, and determining the deceleration operation is not performed by the vehicle when the deceleration displacement value is not greater than the predetermined deceleration threshold.

15. The method as claimed in claim 11, wherein in step A), sensing the initial deceleration position at a first time point; and in step B), sensing the current deceleration position at a second time point after the predetermined period has elapsed since the first time point;

in step C), the deceleration displacement value is equal to a quotient of a distance between the initial deceleration position and the current deceleration position divided by a predetermined total deceleration stroke length of the slidable block, the method further comprising a step of determining, by the control unit, whether a deceleration operation is performed by the vehicle, which includes determining the deceleration operation is performed by the vehicle when the deceleration displacement value is greater than a predetermined deceleration threshold, and determining the deceleration operation is not performed by the vehicle when the deceleration displacement value is not greater than a predetermined deceleration threshold.

\* \* \* \* \*